No. 635,534. Patented Oct. 24, 1899.
A. FLORIN.
DEVICE FOR CONNECTING TUBES.
(Application filed May 31, 1899.)
(No Model.)

Witnesses.

Inventor
Albert Florin
per
Attorney.

UNITED STATES PATENT OFFICE.

ALBERT FLORIN, OF BERLIN, GERMANY.

DEVICE FOR CONNECTING TUBES.

SPECIFICATION forming part of Letters Patent No. 635,534, dated October 24, 1899.

Application filed May 31, 1899. Serial No. 718,861. (No model.)

*To all whom it may concern:*

Be it known that I, ALBERT FLORIN, chief engineer, a subject of the German Emperor, residing in the city of Berlin, in the Empire of Germany, have invented certain new and useful Improvements in Devices for Connecting Tubes, of which the following is a full, clear, and exact specification.

My invention has for its object to provide means whereby branch tubes can be easily connected with the main tube in conduits for gas or water. For this purpose the end of the branch tube to be connected is pressed directly against the main tube, which is provided with a suitable opening in the respective portion of its wall.

Figure 1:
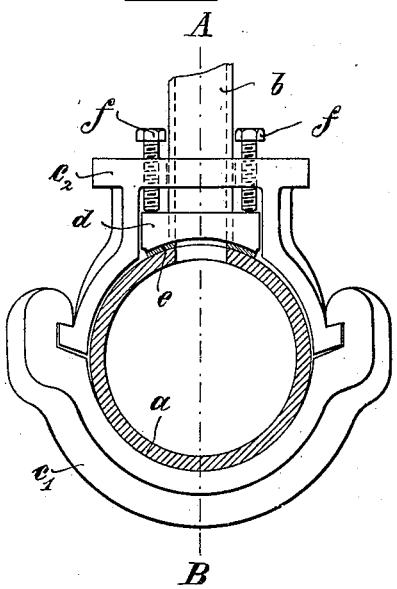
Figure 2:
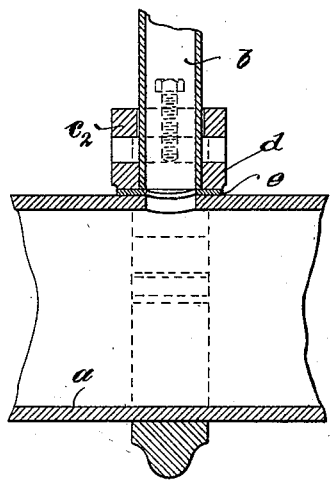
Figure 3:
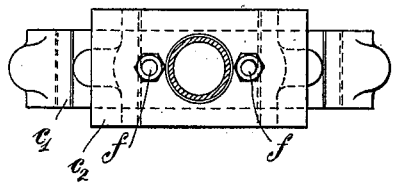
Figure 6:
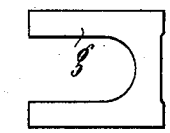
Figure 4:
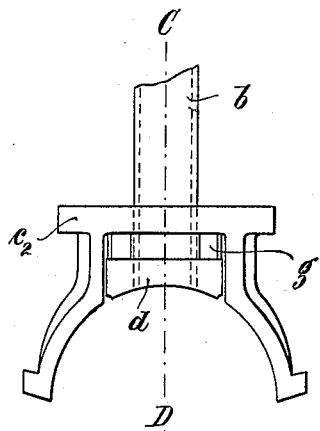
Figure 5:
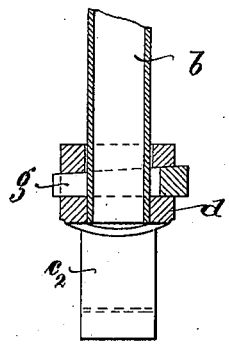

Referring to the accompanying drawings, in which similar letters denote similar parts, Figure 1 is an elevation of the device, partly in section, showing the clamp in operative position on the tubes to be connected. Fig. 2 is a longitudinal section of the device. Fig. 3 is a plan view of the same. Figs. 4 and 5 show the upper part of a modified form of the device. Fig. 6 is a detail.

The device consists of a bipartite clamp $c'$ $c^2$, surrounding the main tube $a$ and branch tube $b$, which are to be connected. Both the part $c'$ and the part $c^2$ of the clamp have their ends bent so as form hook-shaped projections or flanges engaging each other, as is clearly shown in Fig. 1. The upper portion $c^2$ of the clamp is provided with a central opening for the passage of the branch tube $b$, having a saddle-piece $d$ at its free end. The inner surface of the saddle $d$ is curved so as to fit on the outer wall of the main tube $a$. A packing-disk $e$, of suitable material, is preferably inserted between the tube $a$ and the saddle-piece $d$. The tube $b$ is connected with the tube $a$ by means of screws $f$, passing through the upper part of the portion $c^2$ and resting on the piece $d$. It is obvious that by turning the screws $f$ the piece $d$ and the branch tube $b$ connected therewith can be firmly pressed against the main tube $a$, thereby forming a perfectly-tight connection between both tubes.

Instead of the screws $f$ a wedge $g$ may be used for pressing the saddle-piece $d$ against the outer wall of the tube $a$. This wedge $g$, preferably forked, (see Fig. 6,) is inserted between the upper surface of the piece $d$ and the inner surface of the upper portion $c^2$, as shown in Figs. 4 and 5.

What I claim, and desire to secure by Letters Patent, is—

1. The combination with a main pipe and a branch pipe, of a clamp consisting of a section for engaging the main pipe and having hook ends, and a section for engaging the branch pipe and a portion of the main pipe and having hook ends to engage with the first-named hook ends, a saddle-piece on the end of the branch pipe, and means engaging with the last-named clamp-section for pressing said saddle portion against the main pipe, substantially as specified.

2. A clamp for connecting a main pipe and a branch pipe, comprising a section adapted for engaging with the main pipe and having hook ends, a section for engaging with the branch pipe and having hook ends for engaging with the first-named hook ends, a saddle-piece adapted for connection with the branch pipe, and means for causing a pressure between the saddle-piece and the clamp-section engaging the branch pipe, substantially as specified.

3. The combination with a main pipe and a branch pipe, of a saddle-piece on the end of the branch pipe, a clamp-section for engaging around a portion of the main pipe, a clamp-section for engaging with the branch pipe and also having connection with the first-named section, and a wedge inserted between the last-named section and the saddle portion, substantially as specified.

4. The combination with a main pipe and a branch pipe, of a saddle portion on the end of said branch pipe, a clamp-section for engaging around a portion of the main pipe, a clamp-section for engaging with the branch pipe and also for engaging with the first-named section and a wedge for engaging between the last-named clamp-section and the saddle portion for pressing the branch pipe against the main pipe, substantially as specified.

In witness whereof I have hereunto set my hand in presence of two witnesses.

ALBERT FLORIN.

Witnesses:
 WOLDEMAR HAUPT,
 HENRY HASPER.